United States Patent
Nara et al.

(10) Patent No.: US 11,499,114 B2
(45) Date of Patent: Nov. 15, 2022

(54) REFRIGERATOR OIL AND HYDRAULIC FLUID COMPOSITION FOR REFRIGERATORS

(71) Applicant: ENEOS Corporation, Tokyo (JP)

(72) Inventors: Fumiyuki Nara, Tokyo (JP); Yohei Shono, Tokyo (JP); Takeshi Okido, Tokyo (JP); Hidetoshi Ogata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 16/769,352

(22) PCT Filed: Nov. 19, 2018

(86) PCT No.: PCT/JP2018/042646
§ 371 (c)(1),
(2) Date: Jun. 3, 2020

(87) PCT Pub. No.: WO2019/111689
PCT Pub. Date: Jun. 13, 2019

(65) Prior Publication Data
US 2020/0308504 A1    Oct. 1, 2020

(30) Foreign Application Priority Data
Dec. 8, 2017 (JP) .............................. JP2017-236190

(51) Int. Cl.
*C10M 137/10* (2006.01)
*C09K 5/10* (2006.01)
(Continued)

(52) U.S. Cl.
CPC ........... *C10M 137/105* (2013.01); *C09K 5/10* (2013.01); *C10M 169/04* (2013.01);
(Continued)

(58) Field of Classification Search
CPC .. C09K 5/10; C10N 2040/30; C10N 2020/02; C10N 2030/06; C10N 2020/097;
(Continued)

(56) References Cited

U.S. PATENT DOCUMENTS 7,914,697 B2    3/2011  Kaneko
2007/0032391 A1 2/2007  Tagawa et al.
(Continued)

FOREIGN PATENT DOCUMENTS

CN    105934505    9/2016
CN    107001967    8/2017
(Continued)

OTHER PUBLICATIONS

ISR issued in International Patent Application No. PCT/JP2018/042646, dated Jan. 29, 2019, English translation.
(Continued)

*Primary Examiner* — Ellen M McAvoy
(74) *Attorney, Agent, or Firm* — Greenblum & Bernstein P.L.C.

(57) ABSTRACT

A refrigerating oil comprising a lubricating base oil, a first extreme pressure agent containing sulfur and phosphorus as constituent elements and a second extreme pressure agent containing phosphorus but not containing sulfur as constituent elements, and having a kinematic viscosity at 100° C. of 0.5 mm$^2$/s or more and 2.5 mm$^2$/s or less.

12 Claims, 1 Drawing Sheet

(51) Int. Cl.
*C10M 169/04* (2006.01)
*C10N 20/02* (2006.01)
*C10N 30/06* (2006.01)
*C10N 40/30* (2006.01)

(52) U.S. Cl.
CPC . *C10M 2223/041* (2013.01); *C10M 2223/047* (2013.01); *C10N 2020/02* (2013.01); *C10N 2030/06* (2013.01); *C10N 2040/30* (2013.01)

(58) Field of Classification Search
CPC ............ C10M 137/105; C10M 169/04; C10M 2223/041; C10M 2223/047; C10M 171/008
See application file for complete search history.

(56) References Cited

U.S. PATENT DOCUMENTS

| | | |
|---|---|---|
| 2007/0155635 A1 | 7/2007 | Tagawa et al. |
| 2009/0072187 A1 | 3/2009 | Kaneko |
| 2009/0082237 A1 | 3/2009 | Kaneko |
| 2009/0270295 A1 | 10/2009 | Kaneko |
| 2010/0093568 A1* | 4/2010 | Tagawa ................ C10M 169/04 508/133 |
| 2013/0005625 A1 | 1/2013 | Yagishita |
| 2014/0305146 A1* | 10/2014 | Dixon ..................... H05H 5/04 62/84 |
| 2015/0307761 A1 | 10/2015 | Saito et al. |
| 2015/0315454 A1* | 11/2015 | Perez-Cordova ...... C09K 8/265 507/103 |
| 2016/0319214 A1* | 11/2016 | Dos Santos .......... C10M 105/06 |
| 2017/0044462 A1 | 2/2017 | Takahashi et al. |
| 2017/0240834 A1* | 8/2017 | Takahashi .......... C10M 171/008 |
| 2019/0024004 A1* | 1/2019 | Kuroda ................ C10M 177/00 |
| 2019/0241827 A1* | 8/2019 | Kaneko ................... C09K 5/04 |
| 2019/0382666 A1* | 12/2019 | Wiklund .................. C09K 5/10 |
| 2020/0048577 A1* | 2/2020 | Baker ................ C10M 171/008 |
| 2020/0149520 A1* | 5/2020 | Oyagi ................. F04B 39/0238 |
| 2020/0199474 A1* | 6/2020 | Hill, Jr. ..................... C09D 7/63 |
| 2020/0318023 A1* | 10/2020 | Bujouves ........... C10M 171/008 |

FOREIGN PATENT DOCUMENTS

| | | |
|---|---|---|
| EP | 1 921 127 | 5/2008 |
| JP | 2002-097486 A | 4/2002 |
| JP | 2005-248040 A | 9/2005 |
| JP | 2005-325151 A | 11/2005 |
| JP | 2007-262208 A | 10/2007 |
| WO | 2005/012467 A1 | 2/2005 |
| WO | 2005/012469 A1 | 2/2005 |
| WO | 2006/062245 A1 | 6/2006 |
| WO | 2007/026646 A1 | 3/2007 |
| WO | 2007/026647 A1 | 3/2007 |
| WO | 2007/058082 A1 | 5/2007 |
| WO | 2007/105452 | 9/2007 |
| WO | 2011/114848 A1 | 9/2011 |
| WO | 2014/087903 A1 | 6/2014 |
| WO | 2015/089617 | 6/2015 |
| WO | 2015/163071 A1 | 10/2015 |

OTHER PUBLICATIONS

Written Opinion of ISA issued in Int'l App. No. PCT/JP2018/042646, dated Jan. 29, 2019, English translation.
IPRP issued in Int'l Patent Application No. PCT/JP2018/042646, dated Jun. 9, 2020, English translation.
Extended European Search Report issued in EP Patent Application No. 18886679.2, dated Jul. 8, 2021.
Fei Jian et al., "Advance of Research and Development on Hindered Polyol Ester used as Refrigerator Lubricant", Lubricating Oil, vol. 25, No. 3, Jun. 30, 2010, pp. 6-10.

* cited by examiner

REFRIGERATOR OIL AND HYDRAULIC FLUID COMPOSITION FOR REFRIGERATORS

TECHNICAL FIELD

The present invention relates to a refrigerating machine oil and a working fluid composition for a refrigerating machine.

BACKGROUND ART

A refrigerating machine of a cold storage chamber or an air conditioner is provided with a compressor for circulating a refrigerant in a refrigerant circulation system. The compressor is filled with a refrigerating machine oil for a lubricating sliding member. In general, the lower the viscosity of the refrigerating machine oil is, the lower stirring resistance and the lower friction in a sliding portion can be achieved, so that viscosity reduction of the refrigerating machine oil results in energy saving of the refrigerating machine. In Patent Literature 1, for example, specified refrigerating machine oils in a range of VG 3 or more and VG 8 or less are disclosed.

CITATION LIST

Patent Literature

Patent Literature 1: International Publication No. WO 2006/062245

SUMMARY OF INVENTION

Technical Problem

However, with a refrigerating machine oil having a reduced viscosity, it becomes difficult to maintain an oil film in a sliding portion, so that the abrasion resistance may not be retained. Further, since the refrigerating machine oil is compatible with the refrigerant in a refrigerating machine, the viscosity is greatly reduced at the time of use compared to that of the refrigerating machine oil itself, with lubrication conditions changing from a fluid lubrication region to a mixed lubrication or boundary lubrication region, so that the contact frequency between sliding materials increases. Accordingly, use of an ultra-low viscosity refrigerating machine oil having a kinematic viscosity at 100° C. of 2.5 mm$^2$/s or less or 2.0 mm$^2$/s or less, in particular, has not been sufficiently studied. In particular, in the case of using such an ultra-low viscosity refrigerating machine oil, it is extremely difficult to achieve a refrigerating machine oil having a high abrasion resistance even under severe lubricating conditions such as the mixed lubrication or boundary lubrication conditions.

It is an object of the present invention, in light of these circumstances, to provide a refrigerating machine oil having a low viscosity and high abrasion resistance even under severe lubrication conditions such as mixed lubrication or boundary lubrication conditions, and a working fluid composition for a refrigerating machine containing the refrigerating machine oil.

Solution to Problem

The present invention provides a refrigerating machine oil comprising a lubricating base oil, a first extreme pressure agent containing sulfur and phosphorus as constituent elements and a second extreme pressure agent containing phosphorus but not containing sulfur as constituent elements, and having a kinematic viscosity at 100° C. of 0.5 mm$^2$/s or more and 2.5 mm$^2$/s or less.

The total amount of the first extreme pressure agent and the second extreme pressure agent is preferably 0.1 mass % or more and 5 mass % or less, based on the total amount of the refrigerating machine oil.

The content of the first extreme pressure agent is preferably 5 mass % or more and 20 mass % or less, based on the total amount of the first extreme pressure agent and the second extreme pressure agent.

The content of the first extreme pressure agent is preferably 0.01 mass % or more and 2 mass % or less, based on the total amount of the refrigerating machine oil.

The present invention also provides a working fluid composition for a refrigerating machine, containing the refrigerating machine oil of the present invention described above and a refrigerant.

Advantageous Effects of Invention

According to the present invention, a refrigerating machine oil having a low viscosity and high abrasion resistance even under severe lubrication conditions such as mixed lubrication or boundary lubrication conditions, and a working fluid composition for a refrigerating machine containing the refrigerating machine oil can be provided.

DESCRIPTION OF EMBODIMENTS

Embodiments of the present invention are described in detail as follows.

The refrigerating machine oil of the present embodiment contains a lubricating base oil, a first extreme pressure agent containing sulfur and phosphorus, and a second extreme pressure agent containing phosphorus but not containing sulfur.

Examples of the lubricating base oil include a crude oil. The mineral oils may be produced by refining lubricant fractions obtained by atmospheric distillation and vacuum distillation of crude oils such as paraffinic and naphthenic crude oils, using a method such as solvent deasphalting, solvent refining, hydrorefining, hydrocracking, solvent dewaxing, hydrodewaxing, clay treatment, and sulfuric acid washing. These refining methods may be used alone or in combination of two or more. As the lubricating base oil, from the viewpoint of availability, preferably, a low-viscosity lubricating base oil for general use as solvent, diluent, or metalworking oil is appropriately selected and used.

The lubricating base oil may consist of the mineral oil described above, or the proportion of the mineral oil may be, usually 50 mass % or more, 70 mass % or more, or 90% by mass based on the total amount of the lubricating base oil. In addition to the mineral oil described above, a hydrocarbon oil such as alkylbenzene or an oxygen-containing oil such as ester may be further contained, as long as the effects of the present invention are not significantly impaired.

The alkylbenzene may be at least one selected from the group consisting of the following alkylbenzene (a1) and alkylbenzene (a2). Alkylbenzene (a1): an alkylbenzene having 1 to 4 alkyl groups each having 1 to 19 carbon atoms, the alkyl groups as a whole having 9 to 19 carbon atoms in total (preferably, an alkylbenzene having 1 to 4 alkyl groups each having 1 to 15 carbon atoms, the alkyl groups as a whole having 9 to 15 carbon atoms in total).

Alkylbenzene (a2): an alkylbenzene having 1 to 4 alkyl groups each having 1 to 40 carbon atoms, the alkyl groups as a whole having 20 to 40 carbon atoms in total (preferably, an alkylbenzene having 1 to 4 alkyl groups each having 1 to 30 carbon atoms, the alkyl groups as a whole having 20 to 30 carbon atoms in total).

The ester may be, for example, an ester of a monohydric alcohol or a dihydric alcohol and a fatty acid. The monohydric alcohol or the dihydric alcohol may be, for example, an aliphatic alcohol having 4 to 12 carbon atoms. The fatty acid may be, for example, a fatty acid having 4 to 19 carbon atoms.

In order to produce a refrigerating machine oil having the characteristics described below, it is preferable that the characteristics of the lubricating base oil as the main component (for example, 90 mass % or more) be equivalent to the characteristics of the refrigerating machine oil, unless otherwise specified in the present specification. Accordingly, the characteristic ranges for each item of the refrigerating machine oil described below may be replaced with characteristic ranges for each item of the lubricating base oil contained in the refrigerating machine oil, unless otherwise specified in the present specification. For example, the distillation characteristics of the lubricating base oil in GC distillation are not particularly limited as long as the distillation characteristics of the refrigerating machine oil are in the ranges described below. The specifications ranging from the initial boiling point IBP to the 90% distillation temperature $T_{90}$ of the lubricating base oil and the specifications related thereto are hardly affected by blending of additives, and may be therefore replaced with, for example, approximately the same distillation characteristics of the refrigerating machine oil described below or ranges within ±5° C. The distillation end point EP of the lubricating base oil may be, for example, 450° C. or less, and the 95% distillation temperature $T_{95}$ may be, for example, 410° C. or less.

The kinematic viscosity of the lubricating base oil at 40° C. may be, for example, 2.0 mm$^2$/s or more, 2.5 mm$^2$/s or more, or 2.7 mm$^2$/s or more, and may be, for example, 4.5 mm$^2$/s or less, 4.0 mm$^2$/s or less, or 3.5 mm$^2$/s or less. The kinematic viscosity of the lubricating base oil at 100° C. may be, for example, 0.5 mm$^2$/s or more, 0.6 mm$^2$/s or more, 0.8 mm$^2$/s or more, or 1.0 mm$^2$/s or more, and may be, for example, 2.5 mm$^2$/s or less, 2.0 mm$^2$/s or less, 1.5 mm$^2$/s or less, or 1.3 mm$^2$/s or less. The kinematic viscosity in the present invention refers to a kinematic viscosity measured in accordance with JIS K 2283: 2000.

The sulfur content of the lubricating base oil may be, for example, 0.05 mass % or less, 0.02 mass/or less, or 0.01 mass/or less, and may be less than 0.02 mass %. Although the sulfur content of the lubricating base oil may be less than 0.0001 mass %, the sulfur content may be, for example, 0.0001 mass % or more, 0.0005 mass % or more, or 0.001 mass % or more, from the viewpoint of further enhancement of combination effects of the first and second extreme pressure agents. The sulfur content in the present invention refers to the sulfur content measured by the ultraviolet fluorescence method specified in JIS K2541-6: 2013.

The content of the lubricating base oil may be, for example, 50 mass % or more, 60 mass % or more, 70 mass % or more, 80 mass % or more, 90 mass % or more, or 95 mass % or more, based on the total amount of the refrigerating machine oil, and may be, for example, 99.5 mass % or less, 99 mass % or less, or 98.5 mass % or less.

The refrigerating machine oil of the present embodiment contains a first extreme pressure agent and a second extreme pressure agent.

The first extreme pressure agent is an extreme pressure agent containing sulfur and phosphorus as constituent elements in the same molecule. Preferred examples of the extreme pressure agent include a thiophosphoric acid ester.

Examples of the thiophosphoric acid ester include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyl diphenyl phosphorothionate, and xylenyl diphenyl phosphorothionate. Among these, triphenyl phosphorothionate is preferred.

The second extreme pressure agent is an extreme pressure agent containing phosphorus but not containing sulfur as constituent elements in the same molecule, and preferred examples of such a sulfur-free extreme pressure agent include a phosphoric acid ester, an acidic phosphoric acid ester, an amine salt of an acidic phosphoric acid ester, a chlorinated phosphoric acid ester, and a phosphorous acid ester.

Examples of the phosphoric acid ester include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyl diphenyl phosphate, and xylenyl diphenyl phosphate. Among these, triphenyl phosphate and tricresyl phosphate are preferred. Examples of triphenyl phosphate include tri(butylphenyl) phosphate.

Examples of the acidic phosphoric acid ester include monobutyl acid phosphate, monopentyl acid phosphate, monohexyl acid phosphate, monoheptyl acid phosphate, monooctyl acid phosphate, mononyl acid phosphate, monodecyl acid phosphate, monoundecyl acid phosphate and monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, and dioleyl acid phosphate.

Examples of the amine salt of an acidic phosphoric acid ester include a salt of the acidic phosphoric acid ester described above with an amine such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropylamine, tributylamine, tripentylamine, trihexylamine, triheptylamine, and trioctylamine.

Examples of the chlorinated phosphoric acid ester include tris-dichloropropyl phosphate, tris-chloroethyl phosphate, tris-chlorophenyl phosphate, and polyoxyalkylene bis[di(chloroalkyl)]phosphate. Examples of the phosphite esters include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, torinonyl phosphite, tridecyl phosphite, triundecyl phosphite, tridodecyl phosphite, trioleyl phosphite, triphenyl phosphite, and tricresyl phosphite.

The total amount of the first extreme pressure agent and the second extreme pressure agent may be, for example, 0.1 mass % or more, 1 mass % or more, 1.5 mass % or more, or 1.6 mass % or more based on the total amount of the refrigerating machine oil, from the viewpoint of further excellent in abrasion resistance, and may be, for example, 5 mass % or less, 3 mass % or less, 2.5 mass % or less, or 2 mass % or less.

The proportion of the content of the first extreme pressure agent may be, for example, 5 mass % or more, 8 mass % or more, or 10 mass % or more, based on the total amount of the first extreme pressure agent and the second extreme pressure agent, from the viewpoint of further excellence in abrasion resistance, and may be, for example, 20 mass % or less, 18 mass % or less, 15 mass % or less, or 14 mass % or less.

The content of the first extreme pressure agent may be, for example, 0.01 mass % or more, 0.05 mass % or more, or 0.1 mass % or more, based on the total amount of the refrigerating machine oil, from the viewpoint of further excellence in abrasion resistance, and may be, for example, 2 mass % or less, 1 mass % or less, 0.5 mass % or less, or 0.4 mass % or less. The content of the second extreme pressure agent may be, for example, 0.5 mass % or more, 1 mass % or more, or 1.2 mass % or more, based on the total amount of the refrigerating machine oil, from the viewpoint of further excellence in abrasion resistance, and may be, for example, 5 mass % or less, 3 mass % or less, 2 mass % or less, or 1.8 mass % or less.

The refrigerating machine oil may contain a lubricating additive described below in addition to the lubricating base oil, the first extreme pressure agent and the second extreme pressure agent described above.

Examples of the lubricant additives include an acid scavenger, an antioxidant, an extreme pressure agent other than the first extreme pressure agent and the second pressure agent described above., an oily agent, an antifoaming agent, a metal deactivator, an antiwear agent, a viscosity index improver, a pour point depressant, and a detergent dispersant. The content of these lubricant additives may be 10 mass % or less or 5 mass % or less based on the total amount of the refrigerating machine oil.

The kinematic viscosity of the refrigerating machine oil at 100° C. is 0.5 mm$^2$/s or more and 2.5 mm$^2$/s or less. The kinematic viscosity of the refrigerating machine oil at 100° C. is preferably 0.6 mm$^2$/s or more and 2.0 mm$^2$/s or less, more preferably 0.8 mm$^2$/s or more and 1.5 mm$^2$/s or less, still more preferably 1.0 mm$^2$/s or more and 1.4 mm$^2$/s or less, from the viewpoint of further excellence in balance between the abrasion resistance and the energy saving of the refrigerating machine.

The kinematic viscosity of the refrigeration oil at 40° C. may be, for example, 2.0 mm$^2$/s or more, 2.5 mm$^2$/s or more, 3.0 mm$^2$/s or more, or 3.2 mm$^2$/s, and may be, for example, 4.5 mm$^2$/s or less, 4.0 mm$^2$/s or less, or 3.5 mm$^2$/s or less.

The aniline point of the refrigerating machine oil may be, for example, 60° C. or more, 70° C. or more, 73° C. or more, 76° C. or more, or 80° C. or more from the viewpoint of further excellence in the abrasion resistance. Also, the aniline point of the refrigerating machine oil may be, for example, 100° C. or less, 95° C. or less, or 90° C. or less from the viewpoint of compatibility with organic materials such as polyethylene terephthalate (PET) material and sealing material for use in a refrigeration apparatus (refrigerating machine). The aniline point in the present invention refers to a value measured in accordance with JIS K2256: 2013.

In the distillation characteristics of the refrigerating machine oil in gas chromatography distillation (hereinafter referred to also as GC distillation) (referring to distillation characteristics in GC distillation unless otherwise specified), preferably the distillation temperature on the low boiling point is raised high and the distillation temperature on the high boiling point is maintained in an appropriate range from the viewpoint of further excellence in the balance between the viscosity reduction and the lubricity of the refrigerating machine oil, with the flash point being maintained high. It is preferable that such a refrigerating machine oil have the distillation characteristics described below.

The initial boiling point IBP of the refrigerating machine oil may be, for example, 200° C. or more, 210° C. or more, 220° C. or more, or 230° C. or more, and may be, for example, 260° C. or less, 250° C. or less, or 240° C. or less.

The 5% distillation temperature $T_5$ of the refrigerating machine oil may be, for example, 205° C. or more, 215° C. or more, 225° C. or more, or 235° C. or more, and may be, for example, 265° C. or less, 255° C. or less, or 245° C. or less.

The 10% distillation temperature $T_{10}$ of the refrigerating machine oil may be, for example, 210° C. or more, 220° C. or more, 230° C. or more, or 240° C. or more, and may be, for example, 270° C. or less, 260° C. or less, or 250° C. or less.

The 50% distillation temperature $T_{50}$ of the refrigerating machine oil may be, for example, 230° C. or more, 240° C. or more, 250° C. or more, or 260° C. or more, and may be, for example, 310° C. or less, 300° C. or less, or 280° C. or less.

The 70% distillation temperature $T_{70}$ of the refrigerating machine oil may be, for example, 250° C. or more, 260° C. or more, 270° C. or more, or 280° C. or more from the viewpoints of the lubricity and the high flash point. Also, the 70% distillation temperature $T_{70}$ of the refrigerating machine oil may be, for example, 340° C. or less, 330° C. or less, or 300° C. or less from the viewpoint of viscosity reduction.

The 90% distillation temperature $T_{90}$ of the refrigerating machine oil may be, for example, 270° C. or more, 280° C. or more, 290° C. or more, or 300° C. or more, and particularly preferably 320° C. or more, 330° C. or more, or 340° C. or more from the viewpoint of further excellence in the abrasion resistance. Also, the 90% distillation temperature $T_{90}$ of the refrigerating machine oil may be, for example, 400° C. or less, 370° C. or less, 360° C. or less, or 355° C. or less from the same viewpoint described above.

The 95% distillation temperature $T_{95}$ of the refrigerating machine oil may be, for example, 280° C. or more, 290° C. or more, 300° C. or more, 310° C. or more, or 330° C. or more, and particularly preferably 340° C. or more, 350° C. or more, or 360° C. or more from the viewpoint of further excellence in the abrasion resistance. The 95% distillation temperature $T_{95}$ of the refrigerating machine oil may be, for example, 410° C. or less, 400° C. or less, 390° C. or less, or 380° C. or less.

The distillation end point EP of the refrigerating machine oil may be, for example, 390° C. or more, 395° C. or more, or 400° C. or more from the viewpoint of lubricity. The distillation end point EP of the refrigerating machine oil may be, for example, 440° C. or less, 430° C. or less, or 425° C. or less from the viewpoint of reduction in viscosity.

From the viewpoint of further excellence in the balance between viscosity reduction and lubricity of the refrigerating machine oil with the flash point maintained high, as described above, preferably, while the distillation temperature on the low boiling point side is raised high, the distillation temperature on the high boiling point side is maintained in an appropriate range. In addition to the above, it is preferable that the distillation range be maintained in a moderately narrow, but not too narrow, range as described below, rather than making the distillation range wider.

The difference between the 5% distillation temperature $T_5$ and the 90% distillation temperature $T_{90}$ of the refrigerating machine oil ($T_{90}-T_5$) may be, for example, 40° C. or more, 50° C. or more, or 60° C. or more, and particularly preferably 80° C. or more, or 100° C. or more, and may be, for example, 200° C. or less, 160° C. or less, 150° C. or less, 140° C. or less, or 130° C. or less.

The difference between the initial boiling point IBP and the 90% distillation temperature $T_{90}$ of the refrigerating machine oil ($T_{90}$-IBP) may be, for example, 40° C. or more, 50° C. or more, 60° C. or more, or 70° C. or more, and particularly preferably 80° C. or more, or 100° C. or more, and may be, for example, 170° C. or less, 160° C. or less, 150° C. or less, or 140° C. or less.

The difference between the initial boiling point IBP and the 95% distillation temperature $T_{95}$ of the refrigerating machine oil ($T_{95}$-IBP) may be, for example, 50° C. or more, 60° C. or more, 70° C. or more, or 80° C. or more, and particularly preferably 100° C. or more, or 120° C. or more, and may be, for example, 180° C. or less, 170° C. or less, 160° C. or less, or 150° C. or less.

The difference between the 90% distillation temperature $T_{90}$ and the 95% distillation temperature $T_{95}$ of the refrigerating machine oil ($T_{95}-T_{90}$) may be, from the viewpoint of lubricity, for example, 1° C. or more, 3° C. or more, 5° C. or more, 10° C. or more, or 20° C. or more, and may be, for example, 100° C. or less, 80° C. or less, 50° C. or less, or 40° C. or less.

The difference between the 90% distillation temperature $T_{90}$ and the distillation end point EP of the refrigerating machine oil (EP-$T_{90}$) may be, from the viewpoint of lubricity, for example, 30° C. or more, 50° C. or more, 60° C. or more, or 70° C. or more, and may be, for example, 150° C. or less, 140° C. or less, 130° C. or less, or 120° C. or less, and particularly preferably 100° C. or less, 90° C. or less, or 80° C. or less.

The initial boiling point, the 5% distillation temperature, the 10% distillation temperature, the 50% distillation temperature, the 70% distillation temperature, the 90% distillation temperature and the distillation end point in the present invention refer to the initial distillation point, the 5% distillation temperature, the 10% distillation temperature, the 50% distillation temperature, the 70% distillation temperature, the 90% distillation temperature, the 95% distillation temperature and the distillation end point measured in accordance with the distillation test method by gas chromatography specified in ASTM D7213-05, respectively.

The sulfur content in the refrigerating machine oil may be, for example, 0.001 mass % or more or 0.005 mass % or more, and may be, for example, 0.3 mass % or less, 0.1 mass % or less, or 0.05 mass % or less. Incidentally, although the source of the sulfur content in the refrigerating machine oil is not particularly limited, it is preferable that the sulfur content in the refrigerating machine oil include the sulfur content derived from the lubricating base oil, from the viewpoint of further excellence in abrasion resistance. The proportion of the sulfur content derived from the lubricating base oil in the sulfur content in the refrigerating machine oil may be, for example, 5 mass % or more, 10 mass % or more, or 20 mass % or more, and may be, for example, 50 mass % or less, 40 mass % or less or 30 mass % or less.

The composition ratios of the refrigerating machine oil by ring analysis are preferably maintained in the following ranges, from the viewpoint of further excellence in the balance between viscosity reduction and lubricity of the refrigeration oil, with the flash point maintained high.

The % $C_P$ of the refrigerating machine oil may be, for example, 15 or more, 40 or more, or 50 or more, and may be, for example, 70 or less, 60 or less, or 55 or less.

The % $C_N$ of the refrigerating machine oil may be, for example, 30 or more, 35 or more, or 40 or more, and may be, for example, 85 or less, 70 or less, 60 or less, 50 or less, or 49 or less.

The ratio of the % $C_N$ to the % $C_P$ (% $C_N$/% $C_P$) of the refrigerating machine oil may be, for example, 0.5 or more, 0.6 or more, or 0.7 or more, and may be, for example, 4.5 or less, 2.0 or less, 1.4 or less, 1.3 or less, or 1.2 or less.

The % $C_A$ of the refrigerating machine oil may be, for example, 8 or less, 5 or less, or 3 or less, from the viewpoint of lubricity and stability, and may be 0, 0.5 or more, or 1 or more.

The % $C_P$, the % $C_N$ and the % $C_A$ in the present invention refer to values measured by the method (n-d-M ring analysis) in accordance with ASTM D3238-95 (2010), respectively.

The flash point of the refrigerating machine oil may be, for example, 100° C. or more, 110° C. or more, or 120° C. or more from the viewpoint of safety, and may be, for example, 155° C. or less, or 145° C. or less from the viewpoint of making a low viscosity oil. The flash point in the present invention refers to the flash point measured in accordance with JIS K 2265-4: 2007 (Cleveland open cup (COC) method).

The pour point of the refrigerating machine oil may be, for example, −10° C. or less or −20° C. or less and may be −40° C. or more from the viewpoint of refining cost, though −50° C. or less may be acceptable. The pour point in the present invention refers to the pour point measured in accordance with JIS K 2269: 1987.

The acid value of the refrigerating machine oil may be, for example, 1.0 mg KOH/g or less, or 0.1 mg KOH/g or less. The acid value in the present invention refers to the acid value measured in accordance with JIS K 2501: 2003.

The volume resistivity of the refrigerating machine oil may be, for example, $1.0 \times 10^9$ Ω·m or more, $1.0 \times 10^{10}$ Ω·m or more, or $1.0 \times 10^{11}$ Ω·m or more. The volume resistivity in the present invention refers to the volume resistivity at 25° C. measured in accordance with JIS C2101: 1999.

The water content of the refrigerating machine oil may be, for example, 200 ppm or less, 100 ppm or less, or 50 ppm or less based on the total amount of the refrigerating machine oil.

The ash content of the refrigerating machine oil may be, for example, 100 ppm or less, or 50 ppm or less. The ash content in the present invention refers to the ash content measured in accordance with JIS K2272: 1998.

The refrigerating machine oil of the present embodiment is usually present in a state of working fluid composition for a refrigerating machine mixed with a refrigerant in a refrigerating machine. In other words, the working fluid composition for a refrigerating machine of the present embodiment contains the refrigerating machine oil described above and a refrigerant. The content of the refrigerating machine oil in the working fluid composition for a refrigerating machine may be 1 to 500 parts by mass or 2 to 400 parts by mass relative to 100 parts by mass of the refrigerant.

Examples of the refrigerant include a hydrocarbon refrigerant, a saturated fluorinated hydrocarbon refrigerant, an unsaturated fluorinated hydrocarbon refrigerant, a fluorine-containing ether refrigerant such as perfluoroethers, a bis(trifluoromethyl)sulfide refrigerant, a difluorinated methane iodide refrigerant, and a natural refrigerant such as ammonia and carbon dioxide.

The hydrocarbon refrigerant is preferably a hydrocarbon having 1 to 5 carbon atoms, more preferably a hydrocarbon having 2 to 4 carbon atoms. Specific examples of the hydrocarbon include methane, ethylene, ethane, propylene, propane (R290), cyclopropane, normal butane, isobutane (R600a), cyclobutane, methylcyclopropane, 2-methylbutane, normal pentane, and a mixture of two or more thereof. Among them, the hydrocarbon refrigerant is preferably a hydrocarbon refrigerant which is in a gas state at 25° C. and 1 atm, more preferably propane, normal butane, isobutane, 2-methyl butane or a mixture thereof.

The saturated fluorinated hydrocarbon refrigerant is preferably a saturated fluorinated hydrocarbon having 1 to 3 carbon atoms, more preferably 1 to 2 carbon atoms. Specific examples of the saturated fluorinated hydrocarbon refrigerant include difluoromethane (R32), trifluoromethane (R23), pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa) and 1,1,1,3,3-pentafluorobutane (R365mfc), or a mixture of two or more thereof.

The saturated fluorinated hydrocarbon refrigerant is appropriately selected from the above corresponding to application and required performance. The saturated fluorinated hydrocarbon refrigerant may be, for example, R32 alone; R23 alone; R134a alone; R125 alone; a mixture at a ratio of R134a/R32=60 to 80 mass %/40 to 20 mass %; a mixture at a ratio of R32/R125=40 to 70 mass %/60 to 30 mass %; a mixture at a ratio of R125/R143a=40 to 60 mass %/60 to 40 mass %; a mixture at a ratio of R134a/R32/R125=60 mass %/30 mass %/10 mass %; a mixture at a ratio of R134a/R32/R125=40 to 70 mass/W 15 to 35 mass %/5 to 40 mass %; and a mixture at a ratio of R125/R134a/R143a=35 to 55 mass %/1 to 15 mass %/40 to 60 mass %. More specifically, the saturated fluorinated hydrocarbon refrigerant may be a mixture at a ratio of R134a/R32=70/30 mass %; a mixture at a ratio of R32/R125=60/40 mass %; a mixture at a ratio of R32/R125=50/50 mass % (R410A); a mixture at a ratio of R32/R125=45/55 mass % (R410B); a mixture at a ratio of R125/R143a=50/50 mass % (R507C); a mixture at a ratio of R32/R125/R134a=30/10/60 mass %; a mixture at a ratio of R32/R125/R134a=23/25/52 mass % (R407C); a mixture at a ratio of R32/R125/R134a=25/15/60 mass % (R407E); and a mixture of at a ratio of R125/R134a/R143a=44/4/52 mass % (R404A).

The unsaturated fluorinated hydrocarbon (HFO) refrigerant is preferably an unsaturated fluorinated hydrocarbon having 2 to 3 carbon atoms, more preferably fluoropropene, still more preferably fluoropropene having 3 to 5 fluorine atoms. The unsaturated fluorinated hydrocarbon refrigerant is preferably one or a mixture of two or more of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf). The unsaturated fluorinated hydrocarbon refrigerant is preferably one or more selected from HFO-1225ye, HFO-1234ze and HFO-1234yf from the viewpoint of physical properties of the refrigerant. The unsaturated fluorinated hydrocarbon refrigerant may be fluoroethylene, preferably 1,1,2,3-trifluoroethylene.

Among these refrigerants, a refrigerant with a low global warming potential (GWP) is preferred in order to reduce the impact on the global environment. Examples of the refrigerant include an unsaturated fluorinated hydrocarbon refrigerant and a mixed refrigerant with a GWP of 1000 or less, containing at least one selected from a natural refrigerant such as R290 and R600a. The GWP of these refrigerants may be 500 or less, 100 or less, 50 or less, or 10 or less.

It is preferable that the boiling point of these refrigerants be, for example, 0° C. or less and −60° C. or more from the viewpoint of cooling capacity. In particular, −30° C. or less is more preferred from the viewpoint of high-volume capacity with low compression ratio, while −30° C. or more is more preferred from the viewpoint of small sliding loss of a compressor with a low pressure. Examples of the refrigerant having a high-volume capacity with a low compression ratio include R290 (boiling point: −42.1° C.), and examples of the refrigerant having small sliding loss of a compressor with low pressure include R600a (boiling point: −11.6° C.). It is particularly preferable to use R600a from the viewpoint that improvement in efficiency of the refrigerating machine can be expected due to reduction in the sliding loss of a compressor along with viscosity reduction of the refrigerating machine oil.

The refrigerating machine oil and the working fluid composition for a refrigerating machine of the present embodiment are suitably used in, for example, a refrigerating machine of an air conditioner, a cold storage chamber, an open or closed type car air-conditioner, a dehumidifier, a water heater, a freezer, a cold storage warehouse, a vending machine, a showcase, a chemical plant or the like, which has a reciprocal or rotary type closed compressor, and a refrigerating machine which has a centrifugal compressor.

Figure 1:
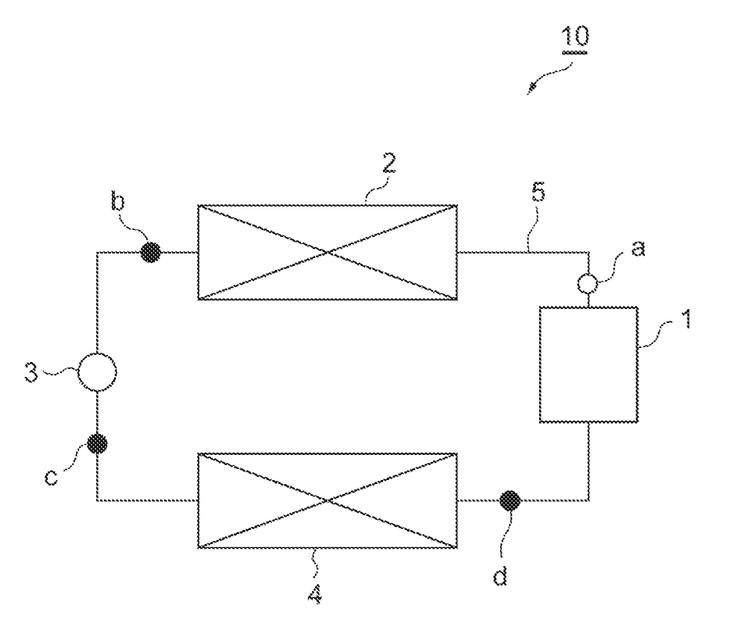
FIG. 1 is a schematic view showing an example of refrigerating machine structure.

FIG. 1 is a schematic view showing an example of a refrigerating machine structure to which the refrigerating machine oil and the working fluid composition for a refrigerating machine of the present embodiment are applied. As shown in FIG. 1, a refrigerating machine 10 is provided with at least a refrigerant circulation system having, for example, a refrigerant compressor 1, a gas cooler 2, an expansion mechanism 3 (a capillary, an expansion valve, etc.), and an evaporator 4 which are sequentially connected through a flow channel 5. In the refrigerant circulation system, first, the refrigerant at high temperature (usually 70 to 120° C.) discharged from the refrigerant compressor 1 into the flow channel 5 is turned into a high-density fluid (supercritical fluid or the like) in the gas cooler 2. Subsequently, the refrigerant is liquefied when passing through a narrow flow channel of the expansion mechanism 3 and then cooled to a low temperature (usually −40 to 0° C.) through evaporation in the evaporator 4.

In the refrigerant compressor 1 in FIG. 1, a small amount of refrigerant and a large amount of refrigerating machine oil coexist under high temperature (usually 70 to 120° C.) conditions. The refrigerant discharged from the refrigerant compressor 1 to the flow channel 5 is in a gas state and contains a small amount (usually 1 to 10%) of refrigerating machine oil as mist. In the refrigerating machine oil in a mist state, a small amount of refrigerant is dissolved (point "a" in FIG. 1). Then, in the gas cooler 2, the refrigerant in a gas state is compressed into a high density fluid, so that a large amount of the refrigerant and a small amount of the refrigerating machine oil coexist under relatively high temperature (about 50 to 70° C.) conditions (point "b" in FIG. 1). Further, the mixture of a large amount of the refrigerant and a small amount of the refrigerating machine oil is sent to the expansion mechanism 3 and the evaporator 4 in sequence so as to be rapidly cooled to low temperature (usually −40 to 0° C.) (points "c" and "d" in FIG. 1), and returned to the refrigerant compressor 1 again.

The refrigerating machine oil and the working fluid composition for a refrigerating machine of the present embodiment can be used together with the refrigerant described above, and particularly suitably used with a hydrocarbon refrigerant from the viewpoint of the cold temperature characteristics and compatibility during refrigerant mixing.

EXAMPLES

The present invention is more specifically described with reference to Examples as follows, though the present invention is not limited to the following Examples.

As the lubricating base oils, commercially available base oils 1 to 4 having characteristics shown in Table 1 were prepared.

TABLE 1

|  |  | Base oil 1 | Base oil 2 | Base oil 3 | Base oil 4 |
| --- | --- | --- | --- | --- | --- |
| Kinematic viscosity at 100° C. | min²/s | 1.0 | 1.3 | 2.2 | 2.2 |
| Kinematic viscosity at 40° C. | min²/s | 2.3 | 3.3 | 7.5 | 8.1 |
| Acid value | mgKOH/g | <0.01 | <0.01 | <0.01 | <0.01 |
| Pour point | ° C. | −25 | −37.5 | <−40 | −32.5 |
| Sulfur content | mass % | <0.001 | <0.001 | <0.001 | 0.025 |
| Flash point COC | ° C. | 108 | 130 | 160 | 166 |
| n-d-M Ring analysis | % $C_A$ | 4.2 | 1.8 | 0 | 8.6 |
|  | % $C_P$ | 59.1 | 44.9 | 60.5 | 54.2 |
|  | % $C_N$ | 36.7 | 53.3 | 39.5 | 37.2 |
|  | % $C_N$/% $C_P$ | 0.6 | 1.2 | 0.7 | 0.7 |

From the base oils 1 to 4 and first extreme pressure agents and second extreme pressure agents shown below, refrigerating machine oils having compositions and characteristics shown in Tables 2 to 4 were prepared (Examples 1 to 11 and Comparative Examples 1 to 2). In the tables, ones with plurality of base oil numbers (for example, "base oils 1, 2, 4" in Example 5) refer to a mixed base oil prepared by mixing the respective base oils. Further, in Table 2 to 4, "A/(A+B)×100" refers to a proportion of the first extreme pressure agent (component A) based on the total amount of the first extreme pressure agent (component A) and the second extreme pressure agent (component B).

(First Extreme Pressure Agent)
A: triphenyl phosphorothionate
(Second Extreme Pressure Agent)
B1: tricresyl phosphate
B2: tri(butylphenyl)phosphate
(Abrasion Resistance Test)

Abrasion resistance of each of the refrigerating machine oils in Examples and Comparative Examples as test oil was evaluated by the following procedure. The results are shown in Table 2 to 4.

The abrasion resistance test was conducted according to a high speed four-ball test in accordance with ASTM D4172-94. Using SUJ2 as a hard ball, the test was carried out under conditions with a test oil amount of 20 ml, a test temperature of 80° C., a rotation speed of 1200 rpm, an applied load of 196 N, and a test time of 15 minutes. The evaluation of abrasion resistance was based on the average value of the abrasion trace diameter (mm) of a fixed ball. The contact pressure at this time was about 2.3 GPa, and the circumferential speed was calculated to be about 36 cm/s. In the case where the average value of the abrasion trace diameters under these conditions is 0.7 mm or less, it can be said that the refrigerating machine oil has high abrasion resistance even under severe lubrication conditions such as mixed lubrication or boundary lubrication conditions. The average value of the abrasion trace diameter is preferably 0.5 mm or less, more preferably 0.45 mm or less, still more preferably 0.4 mm or less.

TABLE 2

|  |  |  | Example 1 | Example 2 | Example 3 | Example 4 | Example 5 | Example 6 |
|---|---|---|---|---|---|---|---|---|
| Base oil |  |  | Base oil 2 | Base oil 2 | Base oil 2 | Base oil 2 | Base oil 1, 2, 4 | Base oil 1, 2, 4 |
| Composition of Refrigerating machine oil | Base oil | mass % | Balance | Balance | Balance | Balance | Balance | Balance |
|  | A |  | 0.1 | 0.2 | 0.3 | 0.2 | 0.2 | 0.2 |
|  | B1 |  | 1.5 | 1.5 | 1.5 | — | 1.5 | — |
|  | B2 |  | — | — | — | 1.5 | — | 1.5 |
| $A/(A+B) \times 100$ |  | mass % | 6.3 | 11.8 | 16.7 | 11.8 | 11.8 | 11.8 |
| Kinematic viscosity at 100° C. |  | mm²/s | 1.3 | 1.3 | 1.3 | 1.3 | 1.3 | 1.3 |
| Kinematic viscosity at 40° C. |  |  | 3.3 | 3.3 | 3.3 | 3.3 | 3.4 | 3.4 |
| Flash point COC |  | ° C. | 131 | 131 | 131 | 131 | 131 | 131 |
| Pour point |  |  | −40 | −40 | −40 | −40 | −35 | −35 |
| Aniline point |  |  | 78 | 78 | 78 | 78 | 80 | 80 |
| Distillation characteristics in gas chromatography | IBP |  | 229 | 229 | 229 | 229 | 230 | 230 |
|  | $T_5$ |  | 246 | 246 | 246 | 246 | 240 | 240 |
|  | $T_{10}$ |  | 252 | 252 | 252 | 252 | 246 | 246 |
|  | $T_{50}$ |  | 275 | 275 | 275 | 275 | 274 | 274 |
|  | $T_{70}$ |  | 285 | 285 | 285 | 285 | 292 | 292 |
|  | $T_{90}$ |  | 295 | 295 | 295 | 295 | 350 | 350 |
|  | $T_{95}$ |  | 300 | 300 | 300 | 300 | 378 | 378 |
|  | EP |  | 410 | 410 | 410 | 410 | 424 | 424 |
|  | $T_{90}-T_5$ |  | 49 | 49 | 49 | 49 | 110 | 110 |
|  | $T_{90}-IBP$ |  | 67 | 67 | 67 | 67 | 120 | 120 |
|  | $T_{95}-IBP$ |  | 71 | 71 | 71 | 71 | 148 | 148 |
|  | $T_{95}-T_{90}$ |  | 4 | 4 | 4 | 4 | 27 | 27 |
|  | $EP-T_{90}$ |  | 115 | 115 | 115 | 115 | 74 | 74 |
| Sulfur content | Total | mass % | 0.009 | 0.019 | 0.028 | 0.019 | 0.025 | 0.025 |
|  | Base oil |  | <0.0001 | <0.0001 | <0.0001 | <0.0001 | 0.006 | 0.006 |
| n-d-M Ring analysis | % $C_A$ |  | 1.8 | 1.8 | 1.8 | 1.8 | 4.3 | 4.3 |
|  | % $C_P$ |  | 44.9 | 44.9 | 44.9 | 44.9 | 52.6 | 52.6 |
|  | % $C_N$ |  | 53.3 | 53.3 | 53.3 | 53.3 | 43.1 | 43.1 |
|  | % $C_N$/% $C_P$ |  | 1.2 | 1.2 | 1.2 | 1.2 | 0.8 | 0.8 |
| Abrasion resistance (abrasion trace diameter) |  | WSD, mm | 0.510 | 0.485 | 0.552 | 0.590 | 0.398 | 0.468 |

TABLE 3

|  |  |  | Example 7 | Example 8 | Example 9 | Example 10 | Example 11 |
|---|---|---|---|---|---|---|---|
| Base oil |  |  | Base oil 1, 2, 4 | Base oil 1, 2, 4 | Base oil 1, 2, 4 | Base oil 1, 2, 4 | Base oil 1, 2, 4 |
| Composition of Refrigerating machine oil | Base oil | mass % | Balance | Balance | Balance | Balance | Balance |
|  | A |  | 0.2 | 0.4 | 0.2 | 0.4 | 0.2 |
|  | B1 |  | 1.5 | 1.7 | 2.0 | 2.5 | 2.5 |
|  | B2 |  | — | — | — | — | — |
| $A/(A+B) \times 100$ |  | mass % | 11.8 | 19.1 | 9.1 | 13.8 | 7.4 |
| Kinematic viscosity at 100° C. |  | mm²/s | 1.3 | 1.3 | 1.3 | 1.3 | 1.3 |
| Kinematic viscosity at 40° C. |  |  | 3.4 | 3.4 | 3.4 | 3.4 | 3.4 |
| Flash point COC |  | ° C. | 131 | 131 | 131 | 131 | 131 |
| Pour point |  |  | −35 | −35 | −35 | −35 | −35 |
| Aniline point |  |  | 80 | 80 | 80 | 80 | 80 |
| Distillation characteristics in gas chromatography | IBP |  | 230 | 230 | 233 | 229 | 229 |
|  | $T_5$ |  | 240 | 240 | 240 | 240 | 240 |
|  | $T_{10}$ |  | 246 | 246 | 246 | 246 | 246 |
|  | $T_{50}$ |  | 274 | 274 | 274 | 274 | 274 |
|  | $T_{70}$ |  | 292 | 292 | 292 | 292 | 292 |
|  | $T_{90}$ |  | 350 | 350 | 350 | 350 | 350 |
|  | $T_{95}$ |  | 378 | 378 | 378 | 378 | 378 |
|  | EP |  | 424 | 424 | 424 | 424 | 424 |
|  | $T_{90}-T_5$ |  | 110 | 110 | 110 | 110 | 110 |
|  | $T_{90}-IBP$ |  | 120 | 120 | 120 | 120 | 120 |
|  | $T_{95}-IBP$ |  | 148 | 148 | 148 | 148 | 148 |
|  | $T_{95}-T_{90}$ |  | 27 | 27 | 27 | 27 | 27 |
|  | $EP-T_{90}$ |  | 74 | 74 | 74 | 74 | 74 |
| Sulfur content | Total | mass % | 0.025 | 0.044 | 0.025 | 0.044 | 0.025 |
|  | Base oil |  | 0.006 | 0.006 | 0.006 | 0.006 | 0.006 |
| n-d-M Ring analysis | % $C_A$ |  | 4.3 | 4.3 | 4.3 | 4.3 | 4.3 |
|  | % $C_P$ |  | 52.6 | 52.6 | 52.6 | 52.6 | 52.6 |
|  | % $C_N$ |  | 43.1 | 43.1 | 43.1 | 43.1 | 43.1 |
|  | % $C_N$/% $C_P$ |  | 0.8 | 0.8 | 0.8 | 0.8 | 0.8 |
| Abrasion resistance (abrasion trace diameter) |  | WSD, mm | 0.398 | 0.537 | 0.481 | 0.365 | 0.529 |

TABLE 4

| Base oil | | | Comparative Example 1 Base oil 2 | Comparative Example 2 Base oil 1, 2, 3 |
|---|---|---|---|---|
| Composition of Refrigerating machine oil | Base oil A | mass % | Balance | Balance |
| | B1 | | 1.7 | 1.7 |
| | B2 | | — | — |
| A/(A + B) × 100 | | mass % | 0 | 0 |
| Kinematic viscosity at 100° C. | | min²/s | 1.3 | 1.2 |
| Kinematic viscosity at 40° C. | | | 3.4 | 3.0 |
| Flash point COC | | ° C. | 130 | 126 |
| Pour point | | | −40 | −30 |
| Aniline point | | | 78.3 | 83.2 |
| Distillation characteristics in gas chromatography | IBP | | 229 | 233 |
| | $T_5$ | | 246 | 240 |
| | $T_{10}$ | | 252 | 243 |
| | $T_{50}$ | | 275 | 264 |
| | $T_{70}$ | | 285 | 276 |
| | $T_{90}$ | | 295 | 314 |
| | $T_{95}$ | | 300 | 347 |
| | EP | | 410 | 406 |
| | $T_{90}$-$T_5$ | | 49 | 74 |
| | $T_{90}$-IBP | | 67 | 81 |
| | $T_{95}$-IBP | | 71 | 114 |
| | $T_{95}$-$T_{90}$ | | 4 | 33 |
| | EP-$T_{90}$ | | 115 | 92 |
| Sulfur content | Total | mass % | <0.0001 | <0.0001 |
| | Base oil | | <0.0001 | <0.0001 |
| n-d-M Ring analysis | | % $C_A$ | 1.8 | 1.9 |
| | | % $C_P$ | 44.9 | 50.2 |
| | | % $C_N$ | 53.3 | 47.9 |
| | | % $C_N$/% $C_P$ | 1.2 | 1.0 |
| Abrasion resistance (abrasion trace diameter) | | WSD, mm | 1.012 | 1.053 |

(Two-Layer Separation Temperature During Mixing with Hydrocarbon Refrigerant)

Further, the two-layer separation temperature of the refrigerating machine oil used in each of Examples was measured in accordance with JIS K 2211: 2009 Appendix D "Refrigerant compatibility test method", using isobutane (R600a) as the refrigerant at a test oil concentration of 10 mass %. At this time, the two-layer separation temperature was −50° C. or lower, so that it was confirmed that the refrigerating machine oil used in Examples was usable as refrigerating machine oil for a hydrocarbon refrigerant.

Reference Signs List

1: REFRIGERANT COMPRESSOR, 2: A GAS COOLER, 3: EXPANSION MECHANISM, 4: EVAPORATOR, 5: FLOW CHANNEL, 10: REFRIGERATING MACHINE

The invention claimed is:

1. A refrigerating machine oil comprising:
a lubricating base oil;
a first extreme pressure agent containing sulfur and phosphorus as constituent elements; and
a second extreme pressure agent containing phosphorus but not containing sulfur as constituent elements, and having a kinematic viscosity at 100° C. of 0.5 mm²/s or more and 2.5 mm²/s or less and a % $C_N$ of 50 or less;
wherein
the first extreme pressure agent is a thiophosphoric acid ester,
the second extreme pressure agent is a phosphoric acid ester,
a content of the first extreme pressure agent is 0.1 mass % or more based on the total amount of the refrigerating machine oil,
a content of the second extreme pressure agent is 0.5 mass % or more based on the total amount of the refrigerating machine oil, and
the content of the first extreme pressure agent is 8 mass % or more and 18 mass % or less, based on the total amount of the first extreme pressure agent and the second extreme pressure agent.

2. The refrigerating machine oil according to claim 1, wherein a total amount of the first extreme pressure agent and the second extreme pressure agent is 1 mass % or more and 5 mass % or less, based on a total amount of the refrigerating machine oil.

3. The refrigerating machine oil according to claim 1, wherein a content of the first extreme pressure agent is 8 mass % or more and 15 mass % or less, based on the total amount of the first extreme pressure agent and the second extreme pressure agent.

4. The refrigerating machine oil according to claim 1, wherein the content of the first extreme pressure agent is 0.1 mass % or more and 2 mass % or less, based on the total amount of the refrigerating machine oil.

5. The refrigerating machine oil according to claim 1, wherein a sulfur content in the refrigerating machine oil is 0.001 mass % or more.

6. The refrigerating machine oil according to claim 1, wherein the first extreme pressure agent comprises triphenyl phosphorothionate, and the second extreme pressure agent comprises at least one selected from the group consisting of tricresyl phosphate and tri(butylphenyl)phosphate.

7. A working fluid composition for a refrigerating machine comprising:
a refrigerating machine oil comprising
a lubricating base oil,
a first extreme pressure agent containing sulfur and phosphorus as constituent elements and
a second extreme pressure agent containing phosphorus but not containing sulfur as constituent elements, and having a kinematic viscosity at 100° C. of 0.5 mm²/s or more and 2.5 mm²/s or less and a %CN of 50 or less; and
a refrigerant;
wherein
the first extreme pressure agent is a thiophosphoric acid ester,
the second extreme pressure agent is a phosphoric acid ester,
a content of the first extreme pressure agent is 0.1 mass % or more based on the total amount of the refrigerating machine oil,
a content of the second extreme pressure agent is 0.5 mass % or more based on the total amount of the refrigerating machine oil, and
the content of the first extreme pressure agent is 8 mass % or more and 18 mass % or less, based on the total amount of the first extreme pressure agent and the second extreme pressure agent.

8. The working fluid composition according to claim 7, wherein a total amount of the first extreme pressure agent and the second extreme pressure agent is 1 mass % or more and 5 mass % or less, based on a total amount of the refrigerating machine oil.

9. The working fluid composition according to claim 7, wherein a content of the first extreme pressure agent is 8 mass % or more and 15 mass % or less, based on the total amount of the first extreme pressure agent and the second extreme pressure agent.

10. The working fluid composition according to claim 7, wherein the content of the first extreme pressure agent is 0.01 mass % 0.1 mass% or more and 2 mass % or less, based on the total amount of the refrigerating machine oil.

11. The working fluid composition according to claim 7, wherein a sulfur content in the refrigerating machine oil is 0.001 mass % or more.

12. The working fluid composition according to claim 7, wherein the first extreme pressure agent comprises triphenyl phosphorothionate, and the second extreme pressure agent comprises at least one selected from the group consisting of tricresyl phosphate and tri(butylphenyl)phosphate.

* * * * *

UNITED STATES PATENT AND TRADEMARK OFFICE
CERTIFICATE OF CORRECTION

PATENT NO. : 11,499,114 B2
APPLICATION NO. : 16/769352
DATED : November 15, 2022
INVENTOR(S) : Fumiyuki Nara et al.

It is certified that error appears in the above-identified patent and that said Letters Patent is hereby corrected as shown below:

In the Claims

Column 17, Line 6 (Claim 10, Line 6) please change "0.01 mass% 0.1 mass%" to -- 0.1 mass% --

Signed and Sealed this
Twenty-eighth Day of February, 2023

Katherine Kelly Vidal
*Director of the United States Patent and Trademark Office*